United States Patent [19]

Leonard

[11] 4,090,957

[45] May 23, 1978

[54] SYSTEM FOR SEPARATING SOLUBLE AND INSOLUBLE COAL PRODUCTS FROM A FEED MIXTURE

[75] Inventor: Robert E. Leonard, Oklahoma City, Okla.

[73] Assignee: Kerr-McGee Corporation, Oklahoma City, Okla.

[21] Appl. No.: 691,578

[22] Filed: Jun. 1, 1976

[51] Int. Cl.² ............................................. B01D 21/00
[52] U.S. Cl. .......................................... 210/54; 208/8
[58] Field of Search .............................. 208/8; 210/54

[56] References Cited

U.S. PATENT DOCUMENTS

| | | | |
|---|---|---|---|
| 3,018,241 | 1/1962 | Gorin | 208/8 |
| 3,598,718 | 8/1971 | Gleim et al. | 208/8 |
| 3,607,716 | 9/1971 | Roach | 208/8 |
| 3,607,717 | 9/1971 | Roach | 208/8 |
| 3,791,956 | 2/1974 | Gorin et al. | 208/8 |
| 3,852,183 | 12/1974 | Snell | 208/8 |
| 3,954,595 | 5/1976 | Sze et al. | 208/8 |

OTHER PUBLICATIONS

Selvig et al., "Analyses of Ash from U.S. Coals", Bulletin #567, Bureau of Mines, 1956.

*Primary Examiner*—Delbert E. Gantz
*Assistant Examiner*—James W. Hellwege
*Attorney, Agent, or Firm*—William G. Addison

[57] ABSTRACT

An improved coal processing system wherein relatively small droplets of a feed mixture (including both soluble and insoluble coal products) are dispersed in a first separation zone and contacted, countercurrently with a dissolving solvent to form a heavy fraction containing the insoluble coal products and a separate light fraction containing the soluble coal products.

11 Claims, 1 Drawing Figure

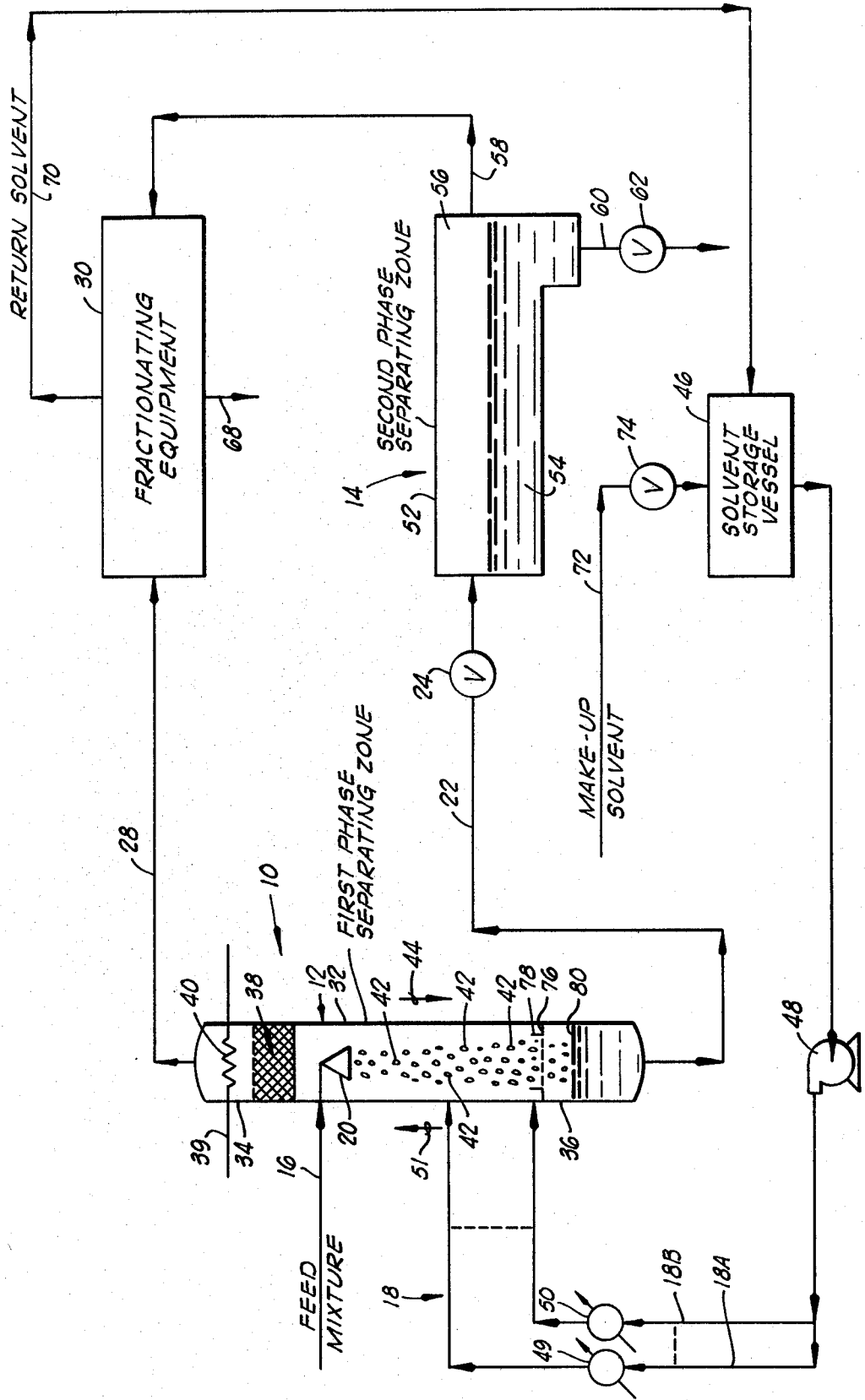

SYSTEM FOR SEPARATING SOLUBLE AND INSOLUBLE COAL PRODUCTS FROM A FEED MIXTURE

CROSS REFERENCE TO RELATED APPLICATIONS

Aspects of the present invention are related to subject matter disclosed in the applicant's co-pending applications "AN IMPROVED COAL PROCESSING SYSTEM FOR REDUCING THE AMOUNT OF INSOLUBLE COAL PRODUCTS IN A LIGHT FRACTION STREAM", filed on June 1, 1976, Ser. No. 691,576 and in the applicant's co-pending application entitled "AN IMPROVED COAL PROCESSING SYSTEM FOR PRODUCING A STREAM OF FLOWABLE INSOLUBLE COAL PRODUCTS", filed on Feb. 23, 1976 Ser. No. 660,334, both co-pending applications being assigned to the same assignee as the present invention.

BACKGROUND OF THE INVENTION

1. Field of the Invention

The present invention relates generally to systems for processing hydrocarbonaceous materials and, more particularly, but not by way of limitation, to an improved system for treating feed mixtures to separate therefrom insoluble coal products.

2. Description of the Prior Art

Various coal processing systems have been developed in the past wherein coal has been treated with one or more solvents and processed to separate the resulting insoluble coal products from the soluble coal products, some systems including provisions for recovering and recycling the solvents.

U.S. Pat. Nos. 3,607,716 and 3,607,717, issued to Roach and assigned to the same assignee as the present invention, disclose processes wherein coal is contacted with a solvent and the resulting mixture then is separated into a heavy fraction containing the insoluble coal products and a light fraction containing the soluble coal products. In such processes, the light fraction is withdrawn and passed to downstream fractionating vessels wherein the soluble coal product is separated into multiple fractions. Other processes for separating the soluble coal products from the insoluble coal products utilizing one or more solvents are disclosed in U.S. Pat. No. 3,607,718, and 3,642,608, both issued to Roach et al., and assigned to the same assignee as the present invention.

U.S. Pat. No. 3,488,278, issued to Nelson, discloses a process for treating coal wherein coal is liquefied in a continuous countercurrent fashion. In that system, the crushed coal is introduced into an upper portion of a vertical vessel and a hydrogen-doner coal solvent is introduced at various vertically spaced positions in the lower portion of the vessel. The coal settles through the solvent to produce a residue stream containing ash and undissolved material in the lower portion of the vessel. U.S. Pat. No. 2,987,465, issued to Johanson, discloses a process wherein a liquid hydrocarbon and a hydrogen rich gas are passed upwardly through a mass of solids for producing a liquid effluent of hydrogenated carbon containing material, the Johanson patent disclosing a process for contacting a gas with liquids in the presence of solids.

BRIEF DESCRIPTION OF THE DRAWING

The single FIGURE diagrammatically and schematically shows a coal processing system arranged in accordance with the present invention.

DESCRIPTION OF THE PREFERRED EMBODIMENT

Referring to the single FIGURE of the drawings, general reference numeral 10 designates a coal processing system arranged in accordance with the present invention, which includes a first separation zone 12 and a second separation zone 14. In general, a feed mixture (comprising soluble coal products and insoluble coal products) is passed through a conduit 16 and introduced into the first separation zone 12, and a dissolving solvent is passed through conduits 18 and introduced into the first separation zone 12. The feed mixture passed into the first separation zone 12 is produced by converting coal to a soluble and meltable form. In one particular process, pulverized coal is contacted with a first dissolving solvent and liquefied to produce a mixture comprising the first dissolving solvent, the soluble coal products and the insoluble coal products. In this particular process, substantially all of the first dissolving solvent is removed from the soluble and the insoluble coal products, and the resulting mixture of the soluble and the insoluble coal products comprises the feed mixture passed through the conduit 16 and into the first separation zone 12.

In the particular process generally described above, the first dissolving solvent preferably is an organic solvent suitable for liquefying coal, and various solvents suitable for liquefying coal are disclosed in the U.S. Pat., Nos. 3,607,716, 3,607,717, 3,607,718 and 3,642,608, for example. Also, the details of particular processes for liquefying coal and producing a feed mixture of the type contemplated via the present invention for introduction into the first separation zone 12 are disclosed in the just-mentioned U.S. patents.

The dissolving solvent contemplated via the present invention for introduction into the first separation zone 12 via the conduit 18 should be distinguished from the solvent referred to before as the δfirst dissolving solvent" which is utilized in a process for liquefying coal. The term "dissolving solvent" as used herein to describe the dissolving solvent introduced into the first separation zone 12 via the conduit 18 refers to a solvent of the type sometimes described as a "light organic solvent" in the above-mentioned U.S. patents and consists essentially of at least one substance having a critical temperature below 800° F. selected from the group consisting of aromatic hydrocarbons having a single benzene nucleus and normal boiling points below about 310° F., cycloparaffin hydrocarbons having normal boiling points below about 310° F., open claim mono - olefin hydrocarbons having normal boiling points below about 310° F., open chain saturated hydrocarbons having normal boiling points below about 310° F.; mono - , di - , and tri-open chain amines containing from about 2-8 carbon atoms, carbocyclic amines having a monocyclic structure containing from about 6-9 carbon atoms, heterocyclic amines containing from about 5-9 carbon atoms, and phenols containing from about 6-9 carbon atoms and their homologs.

The terms "insoluble coal products" as used herein refers to the undissolved coal, ash, other solid inorganic particulate matter and other such matter which is insoluble in the dissolving solvent. The term "soluble coal products" as used herein refers to the matter which is soluble in the dissolving solvent.

A disperser 20 is disposed in the first separation zone 12 and connected to the conduit 16 whereby the feed mixture is discharged from the disperser 20 into the first separation zone 12. The disperser 20 disperses the feed mixture into relatively small particles or droplets which are contacted with the dissolving solvent within the first separation zone 12 for dissolving a substantial portion of the soluble coal products and forming a first light fraction (comprising the soluble coal products and the dissolving solvent) and a first heavy fraction (comprising the insoluble coal products and the dissolving solvent).

The first heavy fraction is separated from the first light fraction in the first separation zone 12. The first heavy fraction is withdrawn from zone 12 through a conduit 22 and passed through a pressure reducing valve 24, interposed in the conduit 22, to the second separation zone 14. The first light fraction is withdrawn from the zone 12 through a conduit 28 and passed downstream to fractionating equipment 30.

It is desirable to maximize the amount of soluble coal products which are recovered from the feed mixture. By processing the feed mixture in accordance with the present invention, the amount of insoluble coal products in the first light fraction withdrawn from the first separation zone 12 is minimized and the amount of soluble coal products in the first heavy fraction withdrawn from the first separation zone 12 is minimized, thereby increasing the soluble coal products recovered from the feed mixture. Also, it has been found that, since the particle size of the feed mixture droplets discharged from the disperser 20 is controlled via the construction and design of the disperser 20, the production capacity of a given size vessel can be increased while still recovering a maximum amount of the soluble coal products from the feed mixture.

The first separation zone 12 includes a first phase separating vessel 32 having an upper portion 34 and a lower portion 36. The disperser 20 is supported within the upper portion 34 of the vessel 32. A coalescing section 38 is disposed and supported within the upper portion 34 of the vessel 32, and a heater 39 having a heating coil 40 is supported within the upper portion 34 generally near the coalescing section 38, the heater 39 being disposed between the coalescing section 38 and the connection of the conduit 28 to the vessel 32.

The feed mixture is passed into the disperser 20 from the conduit 16. In one preferred embodiment, the feed mixture passing through the conduit 16 is at a pressure level in a range of about 700 psig to about 1000 psig and at a temperature level in a range of about 525° F. to about 630° F., for example. In this one particular embodiment, the temperature level in the first phase separating vessel 32 is in a range of about 525° F. to about 630° F., and the pressure level in the vessel 32 is in a range of about 700 psig to about 1000 psig.

The disperser 20 has a plurality of openings or the like (not shown) and functions to form or disperse the received feed mixture into relatively small droplets which are discharged from the disperser 20 into the upper portion 34 of the first phase separating vessel 32 (the small droplets discharged from the disperser 20 being diagrammatically shown in the drawing and some of the small droplets being designated via the reference numeral 42 for clarity). The small droplets 42 discharged from the disperser 20 are allowed to pass or fall via gravity through a portion of the first phase separating vessel 32 in a first direction 44, generally from the upper portion 34 toward the lower portion 36 of the vessel 32. In a preferred embodiment, the disperser 20 functions of form the received feed mixture into droplets having a diameter in a range of about 0.10 millimeters to about 1.0 millimeters and the disperser 20 may be selected from several conventional devices utilized to spray or form liquids into droplets, such devices being well known in the art.

The dissolving solvent is retained in a solvent storage vessel 46 and the dissolving solvent is pumped from the solvent storage vessel 46 into the first phase separating vessel 32 via a pump 48 which is interposed in the conduit 18. In one preferred embodiment, as shown in the drawing, the dissolving solvent, more particularly, is passed into the vessel 32 through a plurality of conduits designated in the drawing via the general reference numeral 18 (only two conduits are shown in the drawing for clarity, one of the conduit being designated via the reference numeral 18A and the other conduit being designated via the reference numeral 18B). A heater 49 is interposed in the conduit 18A for heating the dissolving solvent passing therethrough to a first solvent temperature level and a heater 50 is interposed in the conduit 18B for heating the solvent passing therethrough to a second solvent temperature level, the second solvent temperature level being lower than the first solvent temperature level. The conduits 18A and 18B are each connected to the vessel 32 at positions spaced generally between the lower portion 36 and the upper portion 34. The conduit 18A is connected to the vessel 32 at a position spaced a distance from the position of introducing small droplets of the feed mixture into the vessel 32 via the disperser 20 and generally between the disperser 20 and the lower portion 36 of the first phase separating vessel 32. The conduit 18B is connected to the vessel 32 at a position spaced a distance from the position of introducing the small droplets of the feed mixture into the vessel 32 via the disperser 20 and the lower portion 36, generally between the disperser 20 and the position of introducing the dissolving solvent at the first solvent temperature level via the conduit 18A. Thus, the conduit 18A is connected to the vessel 32 at a position generally nearer the disperser 20 as compared to the connection position of the conduit 18B. In this manner, dissolving solvent at a higher temperature level (the first solvent temperature level) is passed into the vessel 32 at a position generally nearer the disperser 20 as compared to the relatively cooler dissolving solvent at the second solvent temperature level which is passed into the vessel 32 via the conduit 18B. Introducing the dissolving solvent into the vessel 32 at different temperature levels and at positions spaced between the disperser 20 and the lower portion 36 of the vessel 32 with the dissolving solvent at the relatively cooler temperature levels being passed into the vessel 32 at positions generally farther from the disperser 20 and nearer the lower portion 36 of the vessel 32 as compared to the introduction of the dissolving solvent at the relatively higher temperature levels (the first solvent temperature level) has been found to result in an increase in the soluble coal products recoverable from the feed mixture.

The dissolving solvent is passed into the lower portion 36 of first phase separating vessel 32 via the conduits 18 and the dissolving solvent is allowed to pass through a portion of the vessel 32 in a second direction 51, generally from the lower portion 36 toward the upper portion 34. The droplets 42 formed from the feed mixture and discharged from the disperser 20 pass downwardly through the vessel 32 in the first direction 44, as described before, and the dissolving solvent rises or passes upwardly through the vessel 32 in the second direction 51, the droplets 42 passing through and being intimately contacted with the rising dissolving solvent within the first separation zone 12.

The countercurrent flow of the droplets 42 and the dissolving solvent within the vessel 32 results in a countercurrent leaching of the droplets 42 (the feed mixture) which are intimately contacted via the stream of dissolving solvent. As a result of such countercurrent leaching the soluble coal products in the droplets 42 (the feed mixture) are dissolved in the dissolving solvent, and the dissolved coal products and the dissolving solvent form the first light fraction which rises upwardly through the vessel 32, through the coalescing section 38, about the heater 39 and subsequently out through the conduit 28. Further, as a result of such countercurrent leaching, the undissolved droplets 42, the insoluble coal products and a portion of the dissolving solvent fall downwardly through the vessel 32 and form the first heavy fraction. A portion of the first heavy fraction accumulates within a portion of the lower portion of the vessel 32, as diagrammatically illustrated in the drawing, the first heavy fraction being withdrawn from the vessel 32 through the conduit 24.

The first heavy fraction is passed through the pressure reducing valve 24 and into the second separation zone 14. In one particular embodiment, the pressure reducing valve 24 flashes the first heavy fraction to a reduced pressure level substantially equal to atmospheric pressure and a stream, which is essentially a two phase system, passes from the valve 24 to the second separation zone 14.

The second separation zone 14 includes a second phase separating vessel 52 wherein the first heavy fraction is allowed to separate into a fluid-like second heavy fraction which accumulates in a lower portion 54 of the second phase separating vessel 52 and a second light fraction which rises to an upper portion 56 of the vessel 52. The second light fraction, primarily dissolving solvent and vapors containing small amounts of soluble coal products, is withdrawn from the second phase separating vessel 52 through a conduit 58.

The second heavy fraction is withdrawn from the second phase separating vessel 52 through a conduit 60 at a flow rate controlled by a level control valve 62 interposed in the conduit 60, and is passed to downstream apparatus (not shown). The second heavy fraction comprises substantially all of the suspended particles of insoluble coal products contained in the feed mixture initially fed to the first phase separating vessel 32 via the conduit 16. The second light fraction is passed through the conduit 58 to the fractionating equipment 30.

The first light fraction, which rises to the upper portion 30 of the first phase separating vessel 32, is a solvent-rich fraction comprising substantially the soluble coal products and dissolving solvent. That fraction is passed through the conduit 28 to the fractionating equipment 30. The second light fraction is passed through the conduit 58 to the fractionating equipment 30. In one embodiment, the fractionating equipment 30 is designed to separate the first and the second light fractions into one or more coal liquefaction fractions (soluble coal products) which are discharged through a conduit 68 (the conduit 68 being two or more separate conduits in those systems where the soluble coal products are separated into more than one fraction with each individual fraction passing through one of the several conduits represented by the conduit 68 diagrammatically shown in the drawing).

The dissolving solvent passed to the fractionating equipment 30 via conduits 28 and 58 is separated from the soluble coal products and passed from the fractionating equipment 30 through a conduit 70 into the solvent storage vessel 46, thereby recycling the dissolving solvent, as indicated via the designation "RETURN SOLVENT" in the drawing. Additional make-up dissolving solvent is passed into the solvent storage vessel 46 via a conduit 72 at a rate of flow controlled by a valve 74 interposed in the conduit 72. The make-up dissolving solvent and the recycled or return dissolving solvent provide sufficient dissolving solvent to the solvent storage vessel 46 for use in contacting the feed mixture in the first phase separating vessel 32 in a manner generally described before.

In one preferred form, a distributor section 76 is disposed in the lower portion 36 of the first phase separating vessel 32 and a baffle ring 78 is supported on the distributor section 76. The baffle ring 78 is positioned with respect to the conduit 18B such that the dissolving solvent passing into the first phase separating vessel 32 strikingly engages the baffle ring 78, thereby causing the dissolving solvent to have a relatively more even velocity gradient across the cross sectional area of the vessel 32 and providing a relatively more uniform upward flow of the dissolving solvent through the vessel 32. In one form, a baffle ring (not shown) also is positioned in the vessel 32 with respect to the conduit 18A such that the dissolving solvent passing into the vessel 32 strikingly engages such baffle ring in a manner and for reasons like that described before with respect to the baffle ring 78 and the conduit 18B.

The feed mixture is separated in the first phase separating vessel 32 and a predetermined volume of the first heavy fraction is accumulated and maintained within the lower portion 36 of the vessel 32, thereby forming a first heavy fraction surface level 80 within the vessel 32. The distributor section 76 and the baffle ring 78 are supported within the vessel 32 above surface level 80, and thus the conduits 18 are connected to the vessel 32 so the dissolving solvent is discharged within the vessel 32 at a position generally above the surface level 80.

During the operation, the feed mixture is dispersed via the disperser 20 and the feed mixture particles 42 discharged from the disperser 20 are intimately contacted by the countercurrent flowing dissolving solvent within the first phase separating vessel 32, resulting in the separation of the feed mixture into the first light fraction and the first heavy fraction. The first light fraction rises upwardly through the vessel 32 and passes through the coalescing section 38, the heater 39 and out through conduit 28. When ash-containing distillation residues derived from coal liquefaction processes are treated with benzene or other such suitable dissolving solvent, at an elevated temperature and at an elevated pressure, ash or other such insoluble coal products are entrained in numerous liquid droplets, resulting in an undesired carryover of such insoluble coal products in the first fraction withdrawn from the first phase separating vessel 32. The coalescing section 38 is positioned in the vessel 32 to contact the first light fraction for substantially reducing the carryover of insoluble matter in the first light fraction.

To further reduce the carryover of insoluble matter in the first light fraction, the heater 39 heats a portion of the first light fraction prior to withdrawing the first light fraction from the first phase separating vessel 32. When the temperature level of the first light fraction is increased the first light fraction becomes supersaturated, which results in the generation of liquid reflux since the solubility of the soluble coal products in the dissolving solvent is an inverse function of the temperature level. Thus, the heating of the first light fraction by the heater 39 causes a liquid reflux to be generated which wets the coalescing section 38. The wetting of the coalescing section 38 by the liquid reflux causes the first light fraction to be passed through and contacted by the reflux wetted coalescing section 38. The coalescing section 38 in cooperation with the heater 39 provides a relatively large surface which is wetted by reflux generated by the heater 39, and fine insoluble particles which have not been entrained in liquid droplets impinge upon the relatively large wetted surface of the coalescing section 38, such particles being entrained in the liquid droplets formed via the reflux. The insoluble particles entrained in the reflux droplets fall to the lower portion 36 of the first phase separating vessel 32 and thus the insoluble matter in the first light fraction is reduced further by the reflux generating heater 39 operating in cooperation with the coalescing section 38. The liquid reflux also washes the insoluble coal products from the coalescing section 38 for providing a relatively large wetted surface for impingement of any solid insoluble coal products or relatively small liquid droplets entrained with insoluble coal products.

Various tests were conducted for the purposes of illustrating the operation and the effect of the present invention. The various tests are summarized below as numbered examples.

EXAMPLE I

The dissolving solvent is benzene and the benzene is pumped into the vessel 32 via the conduits 18. The linear flow rate of the benzene (dissolving solvent) within the vessel 32 in the second direction 51 is adjusted to about 400 feet per hour and the temperature level in the vessel 32 is about 525° F., the pressure level in the vessel 32 being about 950 psig.

The feed mixture is passed into the vessel 32 via the conduit 16 and the disperser 20 at a rate sufficient to provide a ratio of about five parts by weight of benzene to about one part by weight of feed mixture. In this example, the disperser 20 has a plurality of openings sized and spaced to produce droplets 42 having an average diameter of about 200 microns. The settling rate of the droplets 42 falling through the vessel 32 in the first direction 44 is about 3200 feet per hour, and the net downward velocity of the droplets 42 is about 2800 feet per hour. The settling section of the first phase separating vessel 32 generally between the disperser 20 and the distributor section 76 (that is the length of the section of the vessel 32 through which the droplets 42 fall while contacted by the rising benzene) is about 24 feet and the retention time is about 30 seconds (the time provided for the leaching of the droplets 42 by the upwardly flowing benzene stream).

The leached droplets collect within the lower portion 36 of the vessel 32 (the first heavy fraction) and the first heavy fraction is discharged from the vessel 32 via the conduit 22. The first heavy fraction withdrawn from the vessel 32 contains about forty percent mineral ash about 0.40 percent soluble coal products, the remaining portion of the first heavy fraction substantially comprising insoluble coal when determined on a benzene free basis.

In this example, the first light fraction is passed through the coalescing section 38 where the relatively smaller droplets are removed by impingement on the coalescing media, and the heater 39 is operated at conditions for heating the first light fraction to about 545° F., which is sufficient to generate liquid reflux for wetting and washing the coalescing section 38.

EXAMPLE II

The conditions set forth in Example I, above, are exactly the same, except as noted below. The dissolving solvent is cresol (mixed isomers) and, since the density of cresol is higher than the density of benzene, the flow of the dissolving solvent is adjusted such that the resulting upward velocity of the dissolving solvent in the vessel 32 is about 350 feet per hour. The first heavy fraction withdrawn via the conduit 22 contains about sixty-seven percent by weight of mineral ash determined on a solvent free basis, the amount of soluble coal products being almost negligible and the balance being insoluble coal. In this example, the heater 39 should be operated at conditions for heating the first light fraction to about 565° F. to produce a sufficient amount of liquid reflux for wetting and washing the coalescing section 38.

Changes may be made in the process apparatus or in the steps of the process or in the sequence of the steps of the process of the present invention without departing from the spirit and the scope of the present invention as defined in the following claims.

What is claimed is:

1. A process comprising:
   providing a feed mixture comprising insoluble coal products and soluble coal products;
   providing a dissolving solvent consisting essentially of at least one substance having a critical temperature below 800° F. selected from the group consisting of aromatic hydrocarbons having a single benzene nucleus and normal boiling points below about 310° F., cycloparaffin hydrocarbons having normal boiling points below about 310° F., open chain mono-olefin hydrocarbons having normal boiling points below about 310° F., open chain saturated hydrocarbons having normal boiling points below about 310° F., mono-, di, and tri-open chain amines containing from about 2-8 carbon atoms, carbocyclic amines having a monocyclic structure containing from about 6-9 carbon atoms, heterocyclic amines containing from about 5-9 carbon atoms, and phenols containing from about 6-9 carbon atoms and their homologs;
   introducing the dissolving solvent into a first separation zone;
   dispersing the feed mixture into relatively small droplets and introducing said droplets into the first separation zone;
   countercurrently contacting in the first separation zone the small droplets of the feed mixture with the dissolving solvent for dissolving a substantial portion of the soluble coal products of the feed mixture and forming a first light fraction comprising the soluble coal products and the dissolving solvent and a first heavy fraction comprising the insoluble coal products and the dissolving solvent;

maintaining the temperature level in the first separation zone in a range of from about 525° F. to about 630° F., and maintaining the pressure in the first separation zone in a range of about 700 psig to about 1000 psig;

separating the first heavy fraction and the first light fraction within the first separation zone; and withdrawing the first light fraction from the first separation zone.

2. The process of claim 1 defined further to include the step of:

contacting in the first separation zone the first light fraction with a coalescing section to effect coalescence of droplets of entrained insoluble coal products contained therein.

3. The process of claim 2 defined further to include the steps of:

producing liquid reflux; and wetting the coalescing section with the liquid reflux.

4. The process of claim 3 wherein the step of producing the liquid reflux is defined further to include the step of:

heating the first light fraction in the first separation zone to generate the liquid reflux.

5. The process of claim 1 wherein the first separation zone includes an upper portion and a lower portion, and wherein the step of introducing the feed mixture into the first separation zone is defined further as introducing the small droplets of the feed mixture into the upper portion of the first separation zone, the small droplets of the feed mixture falling through a portion of the first separation zone in a first direction, generally from the upper portion toward the lower portion of the first separation zone; and wherein the step of introducing the dissolving solvent into the first separation zone is defined further as introducing the dissolving solvent into the lower portion of the first separation zone, the dissolving solvent rising through a portion of the first separation zone in a second direction, generally from the lower portion toward the upper portion of the first separation zone, the droplets of the feed mixture passing through and being intimately contacted with the dissolving solvent.

6. The process of claim 5 defined further to include:

engaging the dissolving solvent with a baffle ring in the first separation zone for causing the dissolving solvent to have a relatively even velocity gradient across the cross sectional area of the first separation zone and provide a relatively more uniform flow of the dissolving solvent in the second direction through the first separation zone.

7. The process of claim 5 wherein the step of introducing the dissolving solvent into the first separation zone is defined further to include the steps of:

introducing dissolving solvent at a first solvent temperature level into the first separation zone at a position spaced a distance from the position of introduction of the small droplets of feed mixture into the first separation zone and generally between the position of introduction of the small droplets of feed mixture and the lower portion of the first separation zone; and introducing dissolving solvent at a second solvent temperature level into the first separation zone at a position spaced a distance from the position of introduction of the small droplets of the feed mixture into the first separation zone generally between the position of introduction of the dissolving solvent at the first solvent temperature level and the lower portion of the first separation zone, the second solvent temperature level being lower than the first solvent temperature level.

8. The process of claim 1 defined further to include the steps of:

withdrawing the first heavy fraction from the first separation zone;

introducing the first heavy fraction withdrawn from the first separation zone under reduced pressure into a second separation zone; and separating the first heavy fraction in the second separation zone into a second light fraction comprising the dissolving solvent and a second heavy fraction comprising the insoluble coal products.

9. The process of claim 1 wherein the step of dispersing the feed mixture into relatively small droplets is defined further as dispersing the feed mixture into droplets having a diameter in a range of about 0.10 millimeters to about 1.0 millimeters.

10. The process of claim 9 wherein the feed mixture is dispersed into relatively small droplets having an average diameter of about 0.2 millimeters.

11. The process of claim 1 defined further to include the step of:

passing the first light fraction withdrawn from the first separation zone to fractionating equipment for separating the soluble coal products from the dissolving solvent.

* * * * *